United States Patent

Rumignani et al.

[11] Patent Number: 5,450,935
[45] Date of Patent: Sep. 19, 1995

[54] TORSION DAMPER COMPRISING A CLUTCH FRICTION DISC

[75] Inventors: Paolo Rumignani, Senlis, France; Wienfried Pfefferkorn, Schneidenbach, Germany

[73] Assignee: Valeo, Paris, France

[21] Appl. No.: 111,947

[22] Filed: Aug. 26, 1993

[30] Foreign Application Priority Data

Sep. 2, 1992 [FR] France .................. 92 10473

[51] Int. Cl.⁶ .......................... F16D 3/14; F16D 3/66
[52] U.S. Cl. ..................... 192/106.2; 464/68
[58] Field of Search ............. 192/106.2, 106.1, 70.17, 192/30 V; 464/62, 64, 66, 67, 68

[56] References Cited

U.S. PATENT DOCUMENTS

| | | | |
|---|---|---|---|
| 4,212,380 | 7/1980 | Billet . | |
| 4,440,283 | 4/1984 | Nioloux | 192/106.2 |
| 4,493,408 | 1/1985 | Nagano . | |
| 4,557,702 | 12/1985 | Takeuchi . | |
| 4,577,742 | 3/1986 | Saida | 192/106.2 |
| 4,585,428 | 4/1986 | Asada | 464/68 |
| 4,591,348 | 5/1986 | Takeuchi et al. | 464/64 |
| 4,596,535 | 6/1986 | Ooga . | |
| 4,601,677 | 7/1986 | Takeuchi | 464/68 |
| 4,684,007 | 8/1987 | Maucher | 192/106.2 |
| 4,789,053 | 12/1988 | Fischer et al. | 192/106.2 |
| 4,944,499 | 7/1990 | Tojima . | |
| 5,209,334 | 5/1993 | Fischer et al. . | |

FOREIGN PATENT DOCUMENTS

| | | |
|---|---|---|
| 0475283 | 3/1992 | European Pat. Off. . |
| 1525291 | 4/1967 | France . |
| 2386729 | 11/1978 | France . |
| 2540583 | 8/1984 | France . |
| 2560954 | 9/1985 | France . |

*Primary Examiner*—Richard M. Lorence
*Attorney, Agent, or Firm*—Longacre & White

[57] ABSTRACT

A torsion damper in the form of a clutch friction disc comprises two guide washers bearing first elastic members mounted with clearance in recesses in a wheel disc, and second elastic members interposed circumferentially between reaction plates and the wheel disc. Friction elements intervene between the guide washers and the plates. The second elastic members are fitted radially beneath the first elastic members while the friction elements axially urge the plates towards the wheel disc and comprise on one side of the wheel disc a first elastic washer and a first friction washer in contact with a reaction plate, and on the other side of the wheel disc, a second friction washer in contact with a reaction plate and a third friction washer engaging the first elastic members. The invention is particularly applicable to torsion damping friction discs for use in automobile clutches.

8 Claims, 5 Drawing Sheets

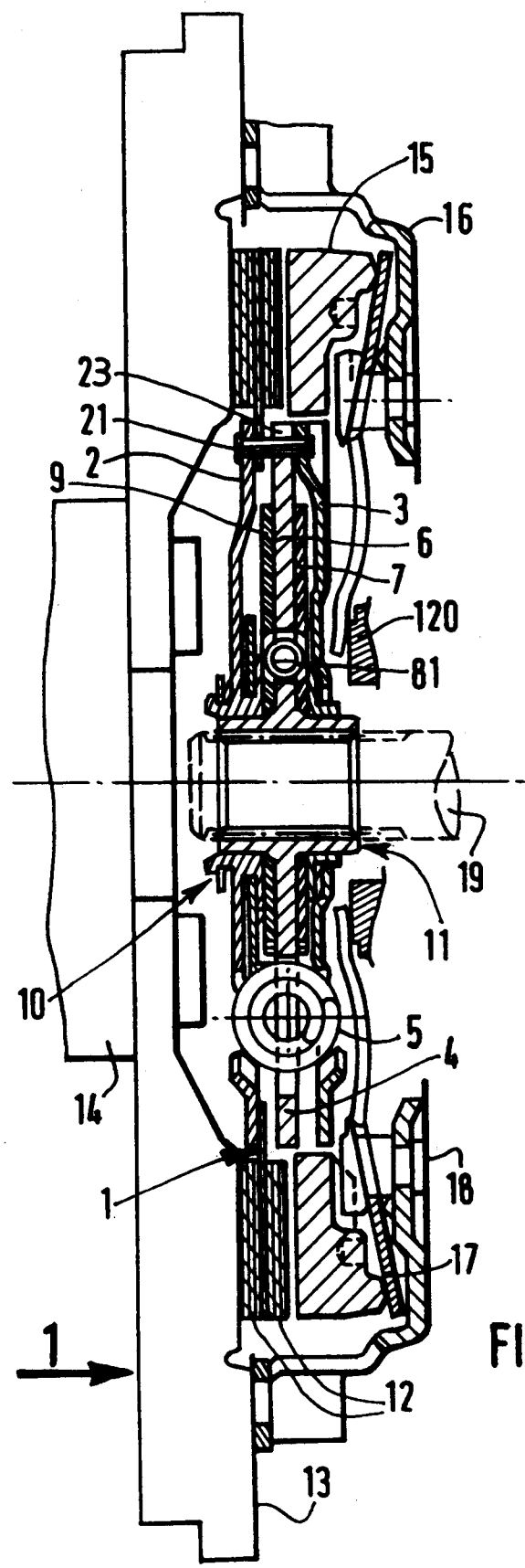
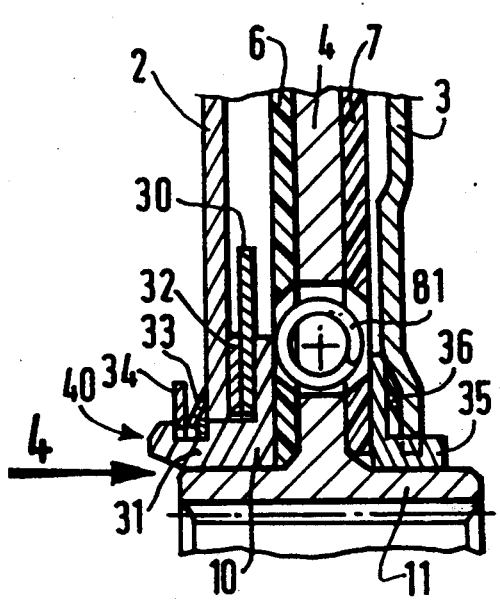
FIG.3
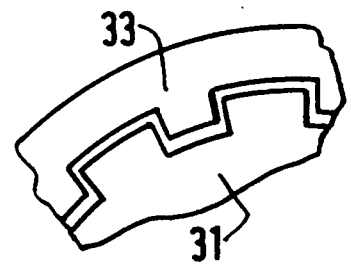
FIG.4
FIG.2

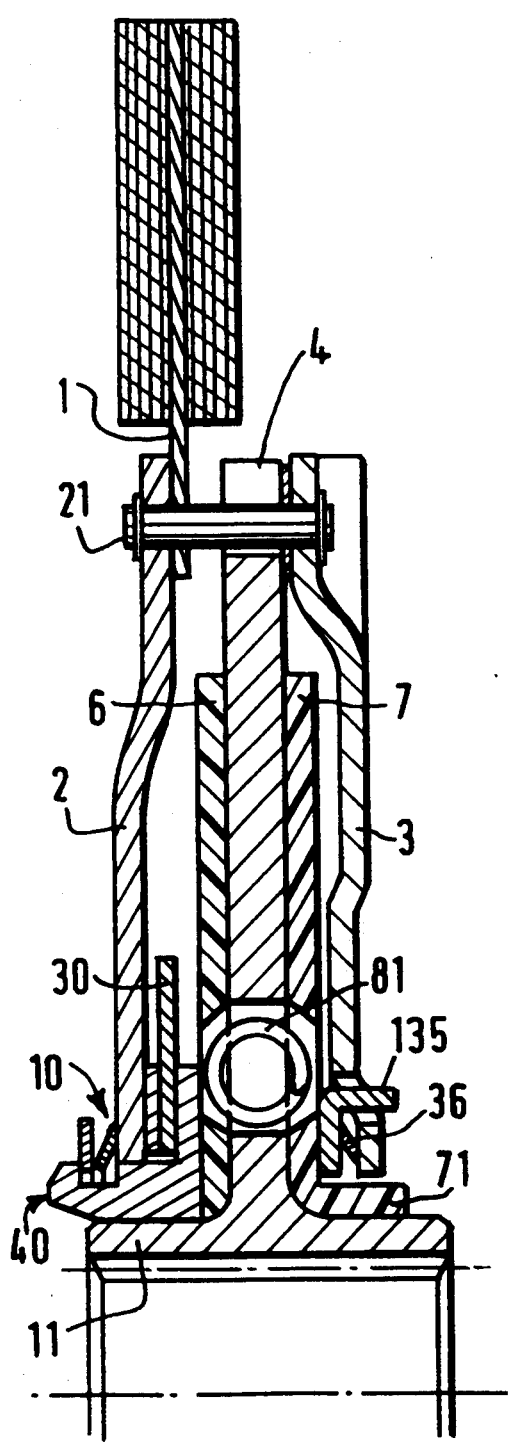
FIG. 7
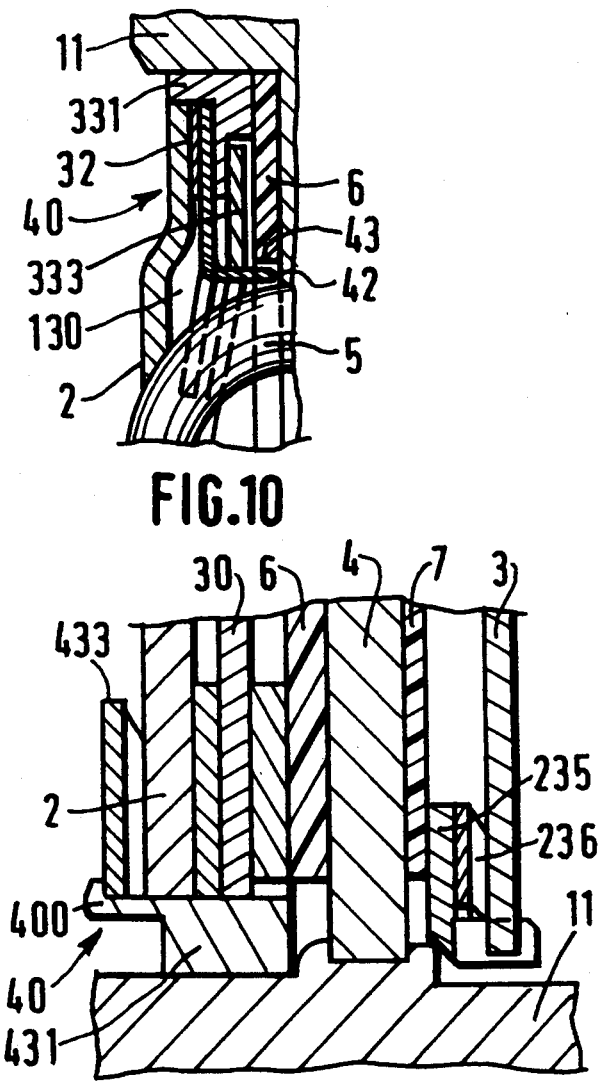
FIG. 10
FIG. 11
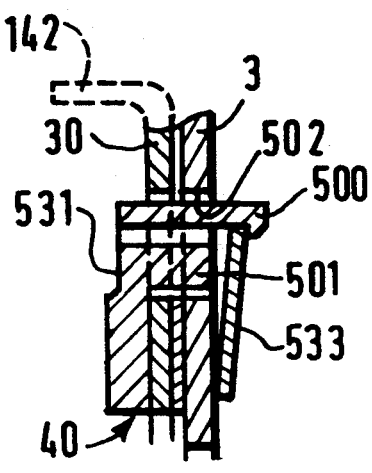
FIG. 12

TORSION DAMPER COMPRISING A CLUTCH FRICTION DISC

FIELD OF THE INVENTION

The present invention relates to torsion dampers, and particularly to torsion damping clutch friction discs for motor vehicles, comprising an input element, two guide washers integral with the input element, an annular wheel disc disposed between the guide washers, first elastic members on the one hand interposed circumferentially between the wheel disc and the guide washers and on the other hand supported by the guide washer whilst being mounted with clearance in first recesses in the wheel disc, generally annular reaction plates disposed on both sides of the wheel disc between by the guide washers, second elastic members, at least partly less stiff than the first elastic members, interposed circumferentially between the reaction plates and the wheel disc, drive means acting between the reaction plates and at least one portion of the first elastic members, elastically gripping friction means acting between the guide washers and the reaction plates; and an output element in the form of a hub integral with the wheel disc which is being angularly displaceable with respect to the guide washers and the reaction plates.

BACKGROUND TO THE INVENTION

Such a damper is described in EP-A-0 475 283 and its corresponding U.S. Pat. No. 5,209,334, which discloses (FIGS. 8 and 9) a damper having second elastic members fitted radially under first elastic members, and elastically gripping friction means which comprise at least a first axially acting elastic washer, which axially urges the reaction plates towards the wheel disc to induce friction between said plates and the wheel disc, so that the reaction plates are separate from one another.

Thus the wheel disc has good mechanical strength, the second elastic members are spared when the first elastic members intervene, and the reaction plates have a double role, i.e. a role as guide washers for the second elastic members, and a friction role with the wheel disc. They follow the movement of the wheel disc during the deferred intervention of the first elastic members.

In this arrangement it is however difficult to control the friction between the parts.

In fact the reaction plates are made partly of metal and partly from plastic material. By their metal part they are shaped frictionally to engage respectively one of the guide washers and the first elastic washer after the action of the first elastic members; by their part made from plastic, they are adapted frictionally to engage the wheel disc during the action of the second elastic members.

SUMMARY OF THE INVENTION

The object of the present invention is to remove this drawback, without unduly weakening the wheel disc, whilst retaining the structure of the reaction plates.

According to the invention a damper of the above-mentioned kind is characterised in that each reaction plate is in frictional contact with a friction washer locked in rotation with the respective guide washer; in that said first elastic washer is interposed axially between one of the guide washers, known as the first guide washer, and one of the friction washers, known as the first friction washer; in that the other friction washer, known as the second friction washer, is axially locked to the other guide washer, known as the second guide washer, and belongs to a friction spacer comprising a stack of washers, one of which forms a third friction washer and is capable of engaging the wheel disc to induce friction on contact with either the second guide washer or the second friction washer; and in that the third friction washer is subject to the action of at least one second axially-acting elastic washer acting between the second friction washer and the second guide washer.

In consequence of this arrangement, the gripping of the reaction plates is well controlled, in particular because the first elastic washer does not act directly on the respective reaction plate.

Furthermore, due to the friction spacer having the second friction washer axially locked onto the second guide washer, the second elastic washer does not make its effect felt on the reaction plates during the action of the second elastic members.

Therefore this second elastic washer can be chosen depending on the application to achieve the desired friction. The same applies for the first elastic washer.

Furthermore, the strength of the wheel disc remains unaltered, as does the structure of the reaction plates. The different frictional forces are properly controlled in this way.

As a result of this construction, an independent hysteresis system can be provided, which is operated in a deferred manner (after elimination of play) by the wheel disc. In one embodiment this system may be associated with the first elastic members and be activated by the wheel disc at the moment of operating the first elastic members, after or before the saturation of the second elastic members of the second stage.

As a refinement, this system may be independent from the first elastic members and be operated in a deferred manner by the wheel disc.

It is possible to form a hysteresis unit or "cassette" with a friction spacer locked in rotation on one of the guide washers and forming a sub-unit with the guide washer with which it is associated.

All these features are advantageous with respect to the filtration of vibrations.

In one embodiment the second elastic washer urges the third friction washer and also the friction spacer towards the respective guide washer for the axial connection of said friction spacer and the second friction washer with the second guide washer. This second elastic washer rests on a shoulder belonging to the second friction washer. It also rests on the second guide washer by being mounted inside or outside the volume delimited by the guide washers.

In one embodiment the reaction plates are made entirely from plastics material and come into direct contact with the wheel disc. This enables a reduction in noise and a good foundation for the first elastic members. The second elastic washer enables the elimination of backlash caused by wear to the different parts without exerting a gripping action on the reaction plates and therefore without interfering with the action of the first elastic washer. A large number of solutions are possible, in particular the second friction washer can be fixed directly onto the guide washer, for example by crimping. In this case the second elastic washer can be fitted axially between the second guide washer and the second friction washer, which is sufficiently strong not to be deformed by the second elastic washer.

BRIEF DESCRIPTION OF THE DRAWINGS

FIG. 2 is a sectional view along line 2—2 of FIG. 1 with a partial representation of a clutch;

FIG. 3 is a view on a larger scale of the upper median portion of FIG. 2;

FIG. 4 is a partial view along arrow 5 in FIG. 3;

FIG. 7 is a half-view in axial section of a damper in a second embodiment;

FIGS. 9 to 12 are partial views in axial section showing different embodiments of the friction crosspiece;

DESCRIPTION OF THE PREFERRED EMBODIMENTS OF THE INVENTION

Figure 1:
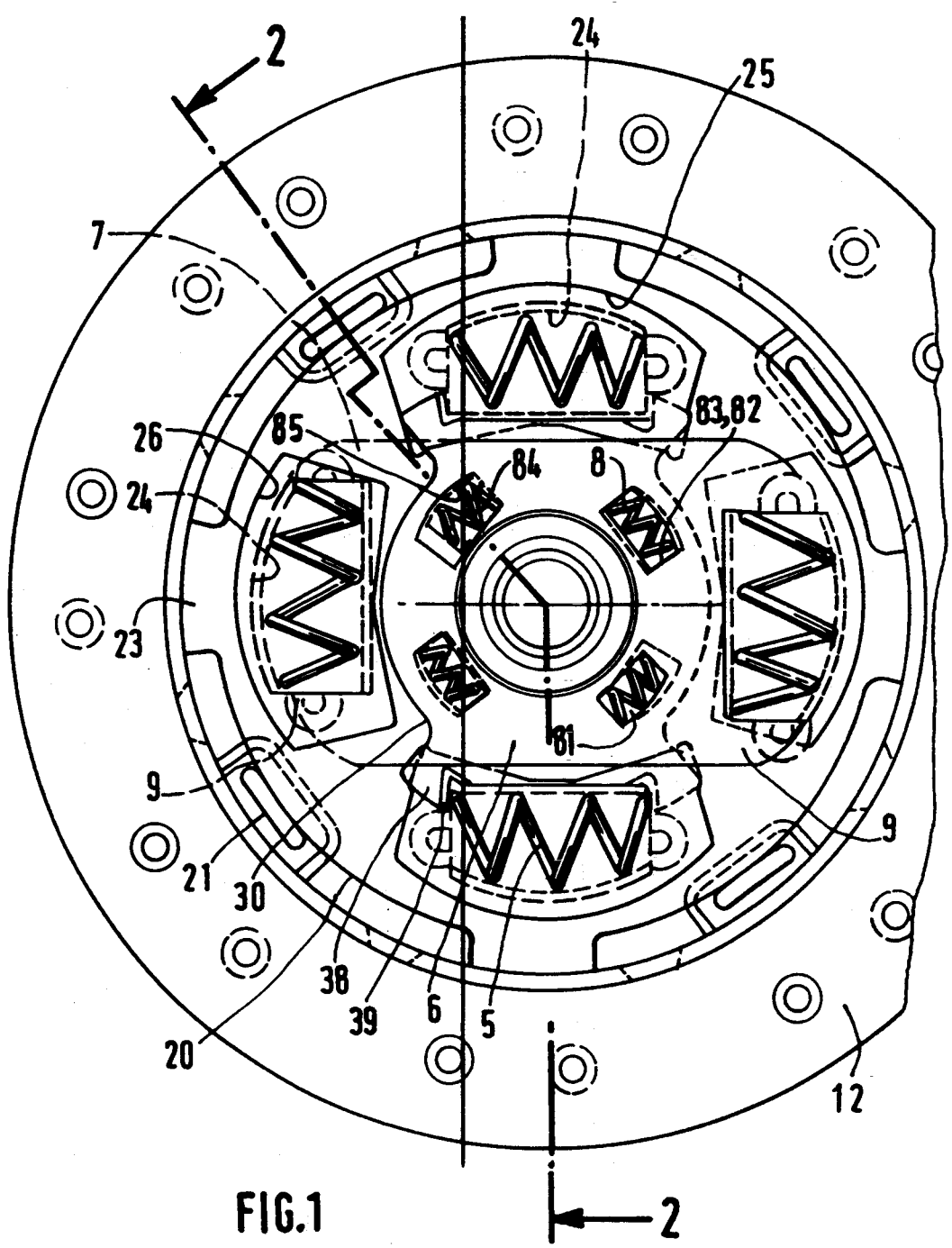
FIG. 1 is a partial view in elevation, locally cut away, of the torsion damper according to the invention, taken along arrow 1 in FIG. 2.

In the figures illustrated, the torsion damper is a clutch friction disc for a motor vehicle having an internal combustion engine which generates vibrations in the transmission.

The damper comprises an input element 1, two guide washers 2, 3 integral with the input element 1, an annular wheel disc 4 disposed between the guide washers 2, 3, first elastic members 5 disposed on the one hand circumferentially between the wheel disc 4 and the guide washers 2, 3 and on the other hand supported by the guide washers 2, 3 whilst being mounted with clearance in first recesses 25, 26, 125 of the wheel disc 4, reaction plates 6, 7 disposed on both sides of the wheel disc 4 whilst being surrounded by the guide washers 2, 3, second elastic members 8, 81, at least partly less stiff than the first elastic members 5, interposed circumferentially between the reaction plates 6, 7 and the wheel disc 4, drive means 9 acting between reaction plates 6, 7 and at least one portion of the first elastic members 5, elastically gripping friction means 10 acting axially between the guide washers 2, 3 and the reaction plates 6, 7; and an output element 11 in the form of a hub integral with the wheel disc 4 whilst being surrounded in rotational manner by the guide washers 2, 3 and the reaction plates 6, 7.

In this case (FIG. 2) the input element 1 consists of a disc having on each of its faces friction liners 12, possibly divided, which are adapted to be clamped between reaction plate 13 and pressure plate 15, which form part of the friction clutch of the motor vehicle. The disc 1 is made integral with the guide washer 2, in a manner known per se, by means of specific rivets (not shown), distance pieces 21 connecting the two guide washers 2, 3.

As a refinement small columns 21 may attach the disc 1 to the washer 2.

Thus parts 1, 2 and 3 are frictionally clamped for rotation with the crankshaft 14 of the internal combustion engine when the clutch is engaged, which occurs with the clamping of the liners 12 between the plates 13, 15 under the action of a diaphragm 17 supported in a cover 16 to urge pressure plate 15 towards reaction plate 13.

Disengagement of the clutch requires pressure to be applied to the ends of the fingers of the diaphragm 17, which is mounted in a tilting manner in the cover 16 by small columns 18, the pressure being applied by means of a clutch release bearing 120 here acting by thrust to tilt the diaphragm and release the pressure plate 15 (FIG. 2).

It will be appreciated that the plate 15 is integral in rotation with the cover plate 16 and is movably mounted axially with respect to said cover, usually by means of tangential tongues, all the parts 15, 16, 17, 18 forming a unit which is mounted on the reaction plate 13 by screws passing through the cover 16, which is formed with a radial flange for this purpose.

The hub 11, which is concentric with the axis of rotation of the friction clutch, is splined internally for its connection in rotation with the input shaft 19 of the gearbox.

Thus normally, when the clutch is engaged, the torque is transmitted from the engine to the hub t1 and to the gearbox by two stepped-action torsion damping devices; the first device comprises the guide washers 2, 3, the wheel disc 4 and the first elastic members 5, whereas the other comprises the reaction plates 6, 7, the wheel disc 4 and the second elastic members 8, 81.

The first device is stronger than the second device and performs the main damping function in normal operation when the vehicle is travelling, the clutch being engaged (running speed). For this purposed the first elastic members 5 have dimensions for running speed.

This first device has proved to be inadequate to absorb effectively the vibrations when the torque transmitted by the friction clutch is very weak or zero, for example, when the gearbox of the motor vehicle is in neutral (idle running).

This role is performed by the second device, which is designed to be weaker, particularly by the selection of elastic members 8, 81 which are given dimensions for idle running.

This second device thus acts as a predamper.

With dampers of this type from the Prior Art which have a toothed connection between the wheel disc and the hub, as described in documents FR-A-2,386,729 and U.S. Pat. No. 4,212, 380, noises have been noted on certain vehicles, occurring in particular during repeated gear changing or gear selection, reversing at low speed, and in first gear at low engine speed when the vehicle is moving.

To prevent this, whilst having, in particular for reasons of comfort, a large angular travel between the wheel disc and the guide washers, the second elastic members 8, 81 are fitted radially beneath first elastic members 5, and the elastically-clamping friction means 10 comprise at least one first axially acting elastic washer 36, interposed between one of the guide washers 2, 3 and one of the reaction plates 6, 7, which axially urges the reaction plates 6, 7 towards the wheel disc 4 to induce friction between said plates 6, 7 and the wheel disc 4, so that the reaction plates 6, 7 are separate from one another.

Thus, in contrast to the provisions described in document FR-A-1,525,291, no interlocking means are required between the reaction washers, so that the strength of the wheel disc is increased and manufacture is simplified.

The first recesses 24, 25 may also be enlarged circumferentially.

It will be appreciated that the friction means 10 allow in particular such interlocking means to be freed.

The fitting of second elastic members 8, 81 beneath first members 5 ensures that the wheel disc 1 is not unduly weakened and that the possible angular travel between the disc and the hub 11 is increased.

Due to the presence of the first elastic members, at the beginning of the relative angular travel between the input element 1 and the hub 11, the guide washers drive the reaction plates 6, 7 with the compression of members 8, 81 between the wheel disc 4 and the plates 6, 7, and also the occurrence of friction in the manner described below.

More precisely, elastic members 5 here consist of helical springs mounted without clearance in the apertures, which comprise windows 24 provided in the guide washers 2, 3, and with clearance in windows 25, 26 provided in facing relationship to one another in the wheel disc 4 and forming the first of said recesses.

In this case four springs 5 are provided distributed regularly and circumferentially on the same circumference radially above elastic members 8, 81, also in the form of helical springs.

It will be appreciated that at least one portion of the elastic members 5, 8, 81 may consist of blocks of elastic material such as an elastomer.

The springs 5 are mounted in pairs, one of the springs surrounding the other (FIG. 2). The springs 8, 81 are also regularly distributed over the circumference and are four in number, two of the springs 8 being mounted without clearance in windows 82, 83 provided in facing relationship to each other in the wheel disc 4 and in the reaction plates 6, 7, whereas two other springs 81 are mounted without clearance in windows 84, provided in the reaction plates and with clearance in windows 85 provided in the wheel disc 4.

Of course, the structures can be inverted, by the springs 81 being mounted without clearance in the windows 85 and with clearance in windows 84 forming second recesses provided in the wheel disc 4.

It will further be appreciated that the springs 8, 81 can be mounted in pockets formed in the plates 6, 7, as can be seen in FIG. 36 of the document U.S. Pat. No. 5,209,334. Similarly, apertures 24 can be formed by means of press-formed zones forming pockets for the springs 5.

The windows 25, 26 can be open at their outer periphery and consist of notches.

Figure 6:
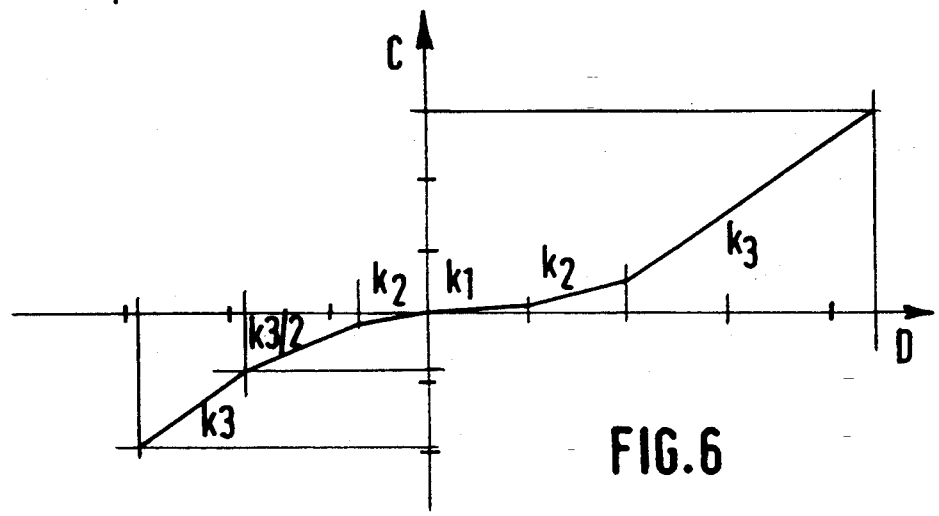

It will be appreciated that this is made possible due to the fitting of springs 8, 81 with respect to springs 5. In practice, springs 8 are less stiff than springs 81, which in turn are less stiff than springs 5. Consequently a predamper having three gradients is obtained (FIG. 6) to the benefit of the comfort of the user and a good filtration of vibrations.

The drive means 9 in this case consist of radial lugs protruding from the outer periphery of plates 6, 7. Each plate comprises at least two radial lugs coming into engagement with the circumferential ends of one of the springs 5. The two lugs form a fork delimiting a notch accommodating a spring.

As can better be seen from FIG. 1, each plate 6, 7 engages two of the diametrically opposite springs 5 by having two forks having lugs 9.

Of course, the drive means may consist of windows provided in the plates 6, 7, the lugs then being connected circumferentially to their outer periphery.

The friction between plates 6 and 7 and the wheel disc 4 can be produced with the intervention of friction washers interposed between the wheel disc and the plates 6, 7.

For example, the plates 6, 7 may be made of metal and, on their face directed towards the wheel disc 4, a lining made from a material having a low coefficient of friction may be attached. As a refinement, the said lining may be fixed on to the wheel disc 4 or be mounted freely in the wheel disc 4 and respective plate 6, 7.

Figure 8:
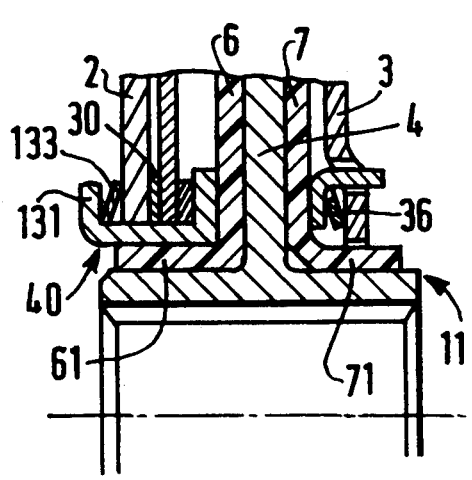
FIG. 8 is a partial half-view in axial section of a damper in a third embodiment.
Figure 9:
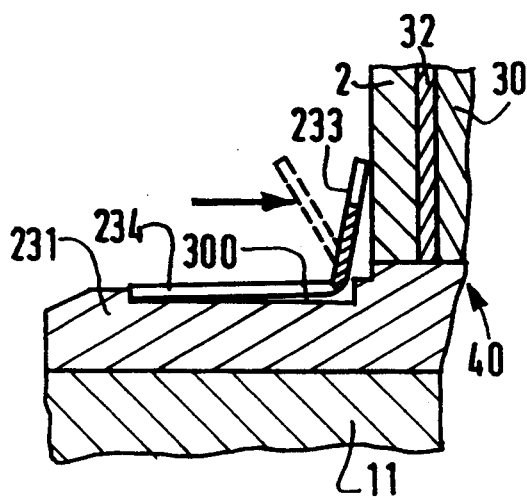
Figure 13:
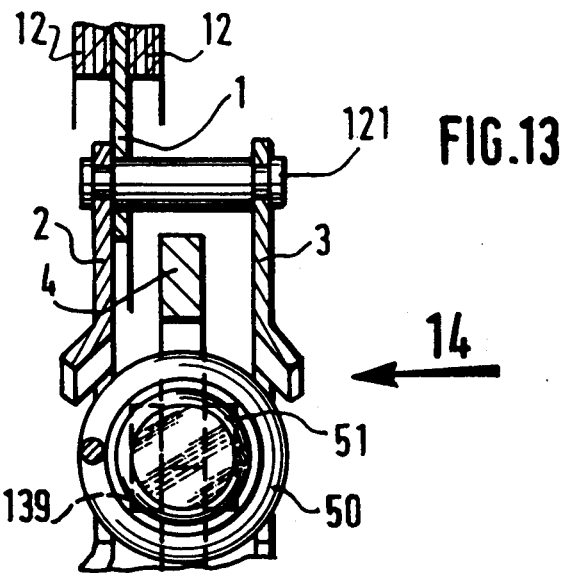
FIG. 13 is a partial view in axial section in yet another embodiment.

Of course, as described in FIGS. 8 and 9 of document U.S. Pat. No. 5,209,334, the plates 6, 7 may be in two parts, their outer periphery being made of metal so as to come into engagement with the springs 5, and their inner periphery being made of plastic material with an L-shaped section with the formation of one of the bearings surrounding the hub 11.

In this case the reaction plates 6, 7 are made entirely of plastic material, advantageously reinforced by strengthening fibres, said plates having a low coefficient of friction and being in contact with the wheel disc 4. This arrangement enables a reduction in noise and in the number of parts, and in the axial clearance between the washers 2, 3. Their construction from plastic material also enables the plates 6, 7 to be thickened at the level of the radial lugs 9 so that a better foundation is obtained for the springs 5. This is quite simple as the plates 6, 7 can be easily produced by moulding. This is made possible due to the provisions according to the invention.

As will be understood, these plates form guide washers for springs 8, 81.

Each plate 6, 7 is, according to the invention, advantageously capable of coming into contact with a friction washer locked in rotation on the guide washer concerned.

More precisely, the axially-acting friction means 10 comprise at least one first elastically gripping elastic washer 36 (FIGS. 3, 4, 7, 8), 236 (FIG. 11) and a first friction washer 35 (FIG. 3), 135 (FIG. 7), 235 (FIG. 11). The first friction washer is subject to the action of the first elastic washer. The said first friction washer and the said first elastic washer are axially fitted between one of the guide washers 3, known as the first guide washer and one of the reaction plates 7.

The said first elastic washer is interposed axially between the first guide washer 3 and the said first friction washer.

A friction spacer 40 is disposed axially between the other guide washer 2, known as the second guide washer, and the other plate 6. Friction spacer 40 is locked in rotation on the second guide washer and is formed by a stack of friction washers, at least one of which 30 (FIGS. 3, 7, 8, 9, 11, 12), 130 (FIG. 10), here known for convenience as the third friction washer, is capable of coming into engagement with at least one of the springs 5 and of being actuated by the wheel disc 4. The friction spacer 40 comprises, according to the invention, a second friction washer locked in rotation and axially on the second guide washer 2. The third friction washer 30 is therefore capable of coming into engagement, in a deferred manner, with the wheel disc 4 in order to induce friction on contact with at least either the second guide washer or the second friction washer. The third friction washer 30 is subject to the action of at least one axially-acting second elastic washer acting between the second friction washer and the second guide washer.

Thus independent frictional forces are obtained, one of which, calibrated by the first elastic washer 36, ensures that the action of the springs 8, 81 is not obliterated, and the other of which, dependent on the third friction washer and on the second elastic washer, is adapted to the springs 5 and to the running speed.

In FIG. 1 the third friction washer 30 is metal and on its outer periphery comprises two radial lugs 38 adjacent springs 5, said lugs being formed with bent-out axially-extending flanges 39, perpendicular to the plane of said washer, operable to come into engagement with the circumferential ends of a spring 5.

The bent out flanges 39 are therefore shaped like a right-angle and are capable of engaging the lateral edges of the windows 25 of the wheel disc 4.

Thus at least one fork having two lugs 38 is defined with flanges 39 capable of being activated in a deferred manner by the wheel disc 4 after elimination of annular play.

In practice, in FIG. 1, the washer 30 is in engagement with two diametrically opposed springs 5 and therefore comprises two forks for reasons of equilibrium.

In the inoperative position of the damper, the lugs 38 are generally perpendicular to the lugs 9 of the reaction plates 6, 7. Two of the springs 5 are therefore used for driving the washer 30 whereas two others are used for driving the plates 6, 7. This is why the windows 25 of wheel disc 4 are different from the windows 26 of the wheel disc 4, the windows 25 being shaped to receive the flanges 39 of the lugs 38. In the inoperative position of the unit, the washer 30 is perpendicular with respect to the plates 6, 7.

In this FIG. 1 all the springs 5 have the same stiffness.

According to one characteristic of the invention, the friction spacer 40 forms a sub-unit with the guide washer 2, 3 with which it is associated.

In FIGS. 1 to 4, the friction spacer 40 comprises the second friction washer 31, in this case made from plastic material, and which has an L-shaped section.

This second washer 31 therefore forms an annular bearing 31 with an axially orientated part, forming a bushing, interposed radially between the outer periphery of the hub 11 and the inner periphery of the guide washer 2. The transverse portion of the bearing 31 is interposed axially between the reaction plate 6 and the third friction washer 30.

A friction washer 32 is axially interposed between the washer 30 and the guide washer 2. This washer 32 can be freely mounted between the washers 30 and 2 or be integral, for example by bonding, with the washer 30 or 2. In this case washer 32 is integral with the washer 30.

It will be appreciated that in certain cases the washer 32 may be omitted and there may be direct contact between the washer 30 and the guide washer 2 depending on the nature of the friction required. Similarly, another friction washer may intervene between the washer 30 and the second friction washer 31. In all cases the third friction washer is permitted to rub, directly or indirectly, against either the second guide washer 2 or the second friction washer 31.

On their inner periphery each of the guide washers 2 and 3 has notches, whereas on its outer periphery the bearing 31 has lands capable of cooperating in a complementary manner with said notches.

The bearing 31 is thus connected in rotation, by the cooperation of shapes, with the second guide washer 2. The first axially-acting elastic washer 36 in this case consists of a Belleville ring, as a refinement of an undulating washer, whereas the first friction washer 35 consists of an annular bearing having an L-shaped section inserted radially between the inner periphery of the first washer 3 and the outer periphery of the hub 11. This bearing 35 is connected in rotation with the washer 3, by the cooperation of shapes, due to lands which said bearing 35 has to cooperate in a complementary manner with the notches of the washer 3.

The bearing 35 therefore forms a bearing washer interposed between the washer 3 and the plate 7. The spring 36 rests on the washer 3 to stress the bearing on contact with the plate 7 in order to grip the spacer 40 between the plate 6 and the washer 2.

Each plate 6, 7 is therefore, according to the invention, in contact with a friction washer 31, 35, locked in rotation on the respective guide washer 2, 3.

The spacer 40 is also associated with at least one specific axially-acting second elastic washer 33. This second washer consists (FIGS. 1 to 4) of a Belleville ring, as a refinement of an undulating washer, resting on the second guide washer 2 on the outside of the volume delimited by the washers 2, 3.

Of course, several elastic washers 33 or 36 mounted in series may be provided. On its inner periphery washer 33, which is accessible from the outside, has lugs engaged in complementary notches (FIG. 4) formed on the outer periphery of the bushing of the bearing 31, in order to lock it in rotation with respect to the bearing 31 (with respect to the bushing thereof). A stop circlip 34 is mounted on said axial portion of the bearing to axially immobilise the washer 33 and to serve as a shoulder.

Thus the washer(s) 33, by resting on the circlip 34, urges the transverse portion of the bearing 31 axially towards the washer 2 to grip the washers 30 and 32. The washer 33 is therefore borne by the bearing 31 and a sub-assembly consisting of the spacer 40 and washer 2 is formed, due to the washer 33 resting on the washer 2 and on a shoulder 34 of the bearing 31. The spacer 40, and therefore the second friction washer 31, are thus connected axially to the washer 2, with the ability to eliminate backlash caused by wear to the various washers, since the bearing 31 is able to move axially with respect to the guide washer 2.

This elastic washer 33 has a load greater than that of washer 36 in a manner known per se. In fact the load of the washer 36 is chosen so that the friction produced between the wheel disc 4 and the plates 6, 7 does not obliterate the action of the springs 8 which are not as stiff. The plates 6, 7 made from plastic material contribute to this by minimising the frictional forces.

It will be noted that the washers 36 and 33 are generally fitted on the same circumference, in the vicinity of the hub 11, and that the friction device 10 is compact radially.

Furthermore, the washer 33 does not have any gripping action on the plates 6 and 7 since the second friction washer 31 is locked axially on the second guide washer 32 by being connected axially thereto by means of, in particular, the second elastic washer 33.

Thus the torsion damper operates in the follow manner:

in a first phase in which the liners 12 are gripped between the plates 13 and 15, the torque is transmitted from the crankshaft 14 to the input shaft 19, due to guide washers 2, 3, driving the two stiff springs 5 in FIG. 1, which in turn drive, without being significantly compressed, the plates 6, 7, which in this first phase compress the less stiff springs 8, 81.

The wheel disc 4 and the hub 11, integral with the wheel disc 4 (FIGS. 1 to 4), are therefore driven by these springs 8, 81. During this first stage friction is produced between the plate 6 and the wheel disc 4, as well as between the plate 7 and the wheel disc 4, with no relative movement being produced between the bearing 35 and the plate 7 as well as between the plate 6 and the transverse part of the bearing 31.

Of course, friction permanently occurs between the bearings 31, 35 (the inner bore thereof) and the outer periphery of the wheel disc 11.

It will be noted that the washer 30 is also permanently subject to the action of the elastic washer 36.

This first phase continues until the plates 6, 7, by their windows 85, come to contact the springs 81, which are then compressed in a second phase, the friction means 10 intervening in the same way as above.

In a third phase, the angular backlash between the windows is eliminated and the springs 5 are allowed to be compressed. During this third phase, relative movement is produced between the plates 6, 7 and respectively the transverse portions of the bearings 31, 35 with an increase in friction.

In fact, the wheel disc 4 with its windows 25, 26 compresses the springs 5, and the plates 6, 7 become detached from the guide washers 2, 3 and follow the movement of the wheel disc 4 as a result of the springs 81 which relax just like the springs 8. Thus the plates 6, 7 are follower plates.

It will be appreciated that, according to one characteristic, the calibration of the spring 36 and the calibration of the springs 8, 81 are chosen so that this movement is produced, the springs 8, 81 then being chosen so that they allow a circumferential actuation of the plates 6 and 7 despite the axial gripping action exerted by the spring 36, which permits compressing of the plates 6 and 7 between the bearings 31, 35.

Thus, when the wheel disc 4 comes into engagement with the springs 5, there is firstly a relaxation of the springs 8, 81 until there is equilibrium between the friction torque, caused by the friction means 10, particularly at the washer 36 acting on the wheel disc, and the torque supplied by the compressed springs 8, 81. Then the plates 6, 7 follow the movement of the wheel disc 4.

As a result of this arrangement, the second elastic members 8, 81, which are not as stiff, are spared and are not unduly stressed contrary to the arrangement of FIGS. 1 to 7 in document U.S. Pat. No. 5,209,334.

As will have been understood and as is evident from the description, the friction washer 30 may be made to intervene in the desired manner, and with a determined gripping action, by the second washer(s) 33 depending on the application.

Thus, in FIGS. 1 to 4, this friction is made to occur after the compression of the springs 81 has commenced. This is made possible by the fact that the washer 30 is mounted on two springs 5 separate from the springs 5 associated with the plates 6 and 7.

Thus after the elimination of annular play between the wheel disc 4 (the windows 25 thereof) and the flanges 39 of the lugs 38, the washer 30 is integral in rotation with the wheel disc 4 and a relative movement is produced between firstly the washer 30 and the bearing 31, and secondly the washer 32 and the guide washer 2.

In this phase, the washer 30 is subject to the action of the springs 36 and 33.

Thus conditions may be right to filter the vibrations and provide a comfortable result for the user, the elastic means 33 being calibrated accordingly. For more information reference should be made to the diagrams in FIGS. 5 and 6, in which k1, k2, k3 are respectively the stiffness of springs 8, 81, 85, h1 is the friction produced via the bearings 31, 35 between the guide washers 2, 3 and the hub 4, whereas h2 is the friction produced within the friction spacer 40 belonging to a hysteresis cassette 40-2 integral with the second guide washer 2.

Of course, circumferential clearance may exist between the flanges 39 and the springs 5. Thus the friction h2 is created before working the springs 5. The washer 30 then acts in the manner of a slide valve.

It will be appreciated that the small columns 21 are flat cross-pieces, i.e. quite thin radially. These cross-pieces (FIG. 1) are fitted radially beyond springs on the outer periphery 20 of the wheel disc 4. These cross-pieces 21, fitted radially above the said periphery 20, are capable of cooperating with radial lugs 23 in a single piece with the wheel disc 4. These lugs 23 protrude radially towards the outside with respect to the periphery 20. Their radial extension depends on the thickness of the cross-pieces 21. Here four lugs 23 and four cross-pieces 21 are provided in a symmetrical manner.

As a consequence of this arrangement, a strong wheel disc and a large angular travel between the input part 1 and the wheel disc 4 are obtained. The angular clearance between one cross-piece 21 and two consecutive lugs 23 depends on the application.

All this enables an increase in the angular travel between the parts 1, 11, more especially as the radial lugs 23 are fitted to the right of the windows 24, 25, which increases the strength of the wheel disc 4.

It will be appreciated the present invention is not restricted to the embodiments described.

In particular, whereas in FIGS. 1 to 4 the plates 6, 7 are identical to one another, in FIG. 7 plate 7 is different and on its inner periphery has a bushing 71 for frictional contact with the outer periphery of the hub 11.

The first friction and bearing washer 135 is modified and here consists of a washer having axial lugs extending into complementary apertures formed in the guide washer 3 for connection in rotation of the washer 135 with the washer 3.

As will have been understood, the bushing 71 has the role of bearing 35 in the first operating phase, friction then being produced between the hub 11 and this bushing 71, advantageously made from plastic material with a low coefficient of friction like plate 7, in one piece with its bushing 71. The bearing 31 therefore only permanently rubs in contact with hub 11.

In FIG. 8, the plate 6 made from plastic material also has at its inner periphery a bushing 61 in contact with the outer periphery of the wheel disc 11, bushing 61 being longer than bushing 71.

The bearing 131, forming the second friction washer, is interposed between the outer periphery of the bushing 61 and the inner periphery of the guide washer.

In this case bearing 131 is made from metal and comprises an end flanged radially in the opposite direction to the axis of the unit after mounting the Belleville ring 133. There is thus formed a shoulder, for the washer 133, in the shape of an elbow so that the circlip 343 in FIG. 3 is no longer necessary. A friction washer is attached to each of the faces of the washer 30. A unit is also formed with the second guide washer 2, comprising the washer 133, the bearing 31 and the third friction washer 30.

Thus, in the first stage, the bushing 61 is integral with the bearing 131 and friction is produced between the inner bore of the bushing 61 and the hub 11, whereas in the third stage, in which the plate 6 follows the movement of the wheel disc 4, friction is produced between the outer periphery of the bushing 61 and the inner bore of the bearing 131 connected in rotation to the guide washer 2. This is characteristic of the invention.

Of course, the stiffness of the bushing 61 may vary, with an internal portion being more flexible to minimise friction between the hub 11 and the bushing, the friction between the bushing 61 and the bearing 131 being greater.

In FIG. 9, the circlip from FIG. 34 is also omitted. For this the bearing 231 made from plastic material has at the exterior of the volume delimited by the washers 2, 3 a groove 300, in which is mounted an elastic washer of the Belleville type 233 with, at its inner periphery, lugs 234 mounted in said groove 300, one of the flanks of which forms a shoulder for the free end of the lugs 234.

The mounting of the washer 233 is performed by axially slipping the washer onto the axial portion of the bearing 231 until the lugs 234 are positioned in the groove 300.

According to one characteristic, the Belleville ring is capable of occupying by reversal two positions, so that with the help of a tool an action is exerted on the washer 233, initially in the position represented in FIG. 9, to turn it over in order to assemble the spacer 40 with the guide washer 2.

In FIG. 10 the gripping of the third friction washer 130 having radial lugs cooperating with at least one of the springs 5 is ensured in consequence of elastic lugs 333 protruding from the inner periphery of the disc 1 and extending between two springs 5. These lugs are engaged in a complementary manner in the notches provided for this purpose in the bearing 331 made from plastic material, and urge it towards the guide washer 2.

By cooperation with said notches, the lugs 333 ensure a connection during the rotation of the bearing 331 with the disc 1, whereas the washer 130, which does not have the flange 39 shown in FIG. 1, has axially orientated lugs 42 extending with clearance into a notch 43 provided in the low portion of the windows of the wheel disc.

As a result of the lugs 42, the washer 30 is activated by the wheel disc 4.

It will be noted that the lugs 333 rest firstly on the guide washer 2, owing to the fact that the disc 1 is integral with said washer, and secondly on the bearing 331 in order to urge said bearing and the friction spacer towards the guide washer 2 for axial connection therewith.

As can be seen in FIG. 10, there is an axial clearance between the lugs 333 and the respective plate 6. Independent axial gripping of the washer 130 is obtained by forming a unit (hysteresis cassette) comprising the friction spacer 40 and the guide washer 2, whilst having no protruding elastic element, the lugs 333 being intended to be fitted in the volume delimited by the guide washers.

In FIG. 11, the first friction washer 236 is an undulating washer and the same applies for the second elastic washer 433 for the specific gripping of the washer 30.

It will be noted that the wheel disc 4, in this figure, is connected by crimping to the hub 11, whereas in the preceding-figures it was in one piece with the hub 11.

The first friction washer 235 consists of a bearing made of plastic material having a similar shape to that in FIG. 3, but the guide washer 3 comprises at its inner periphery tongues meshing with complementary notches formed in the axial portion of the bearing 235 for connection in rotation of said portions 3, 235.

The bearing 431 forming the second friction washer is made from plastic material and use is made of its configuration to form therein elastically deformable lugs protruding at the exterior of the volume delimited by the washers 2, 3. The mounting of the elastic washer 433 is therefore achieved by locking the lugs 400 which are provided with hooks to retain said washer 433.

The bearing 235 therefore does not participate in frictional contact during the first stage.

In FIG. 12, the relative positions of the friction spacer 40, of the second elastic washer and of the second friction washer have been inverted, and the friction spacer 40 associated with the washer 3 then forms the second guide washer, and the first friction washer, here bearing 35 in FIG. 3, associated with the washer 2 forms the first guide washer and acts with permanent friction at the level of the hub.

Thus the friction washer 531 does not form a bearing but is equipped with elastically deformable lugs 500 passing with clearance through the aperture 502 provided in the guide washer 3. The washer 531 also has axial protuberances 501 engaged in a complementary manner in apertures 502.

Therefore during rotation the second washer 531 made from plastic material is locked with respect to the second guide washer 3, by the cooperation of shapes.

The aperture 502 of the washer 3 is advantageously shaped like a T.

At its outer periphery the second elastic washer 533 is supported on shoulders of lugs 500 formed by means of hooks which said lugs 500 display.

At its inner periphery the Belleville washer 533 is supported on the guide washer 3. This arrangement permits a good tilting of the diaphragm 17, the inclination of said washer 533 being in the same direction as that of the diaphragm 17.

Instead of a flat spacer, it is possible to use small columns 121 connecting between them the two guide washers 2, 3, and said small columns are also used for the attachment of the disc 1 by being fitted radially beyond the wheel disc 4.

No interference occurs between the wheel disc 4 and the spacers 31, and the limitation of the angular travel between the disc 1 and the hub 11 is achieved by contiguous coils of the springs 50 belonging to the first elastic members.

Figure 14:
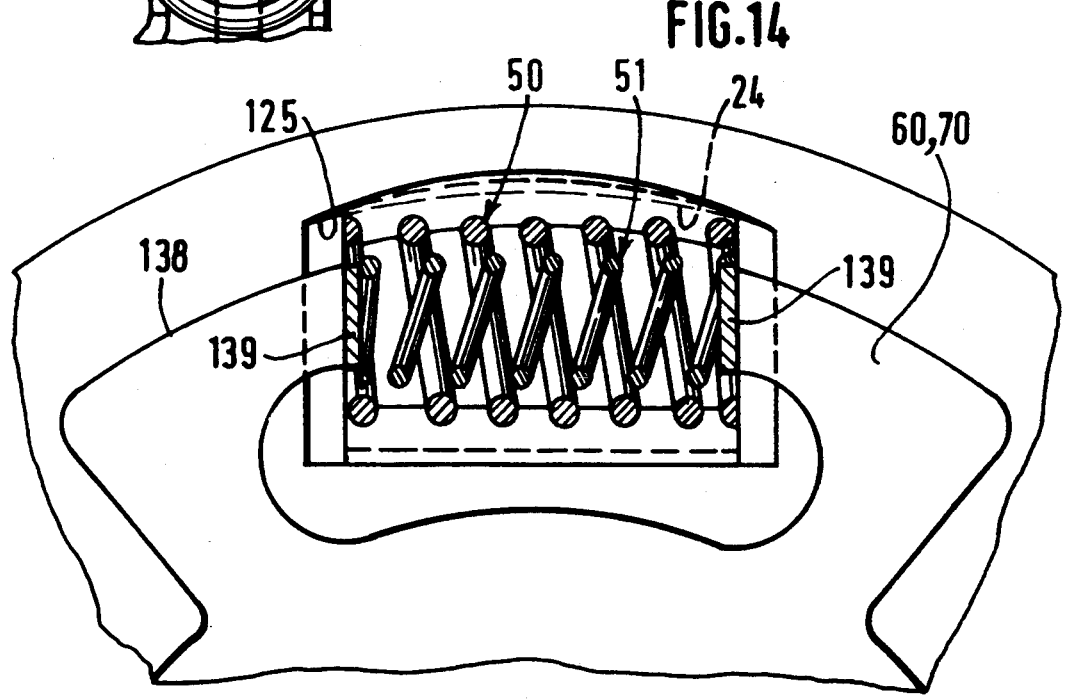
FIG. 14 is a partial view, locally cut away, along arrow 14 in FIG. 13.

More precisely, in this embodiment the spring 50 surrounds a spring 51, the said springs 50, 51 being mounted in pairs in the windows 24 of the guide washers 2, 3, without clearance therein and with clearance in the windows 125 of the wheel disc. In this case an additional plate 60, 70 is interposed axially between each plate 6, 7 and the wheel disc 4. The plates 60, 70 have windows for their mounting without clearance on the springs 81 and at their outer periphery, in a protruding manner, lugs 138 with circumferentially orientated portions at the end of which is provided an axially orientated return 139 (i.e. perpendicular to the respective plane of the plate 60, 70) for support on the respective circumferential end of the spring 51 (FIG. 14).

The springs 51 are prestressed between the two returns 139 defining with the lugs 138, a fork.

As in FIG. 1, the plates 60, 70 are provided with windows for mounting, in this case with clearance, on the springs 8 so that they can act freely in the first stage.

The stiffness of the springs 51, which belong to the first elastic members, is advantageously selected to be identical to that of the springs 81. Thus, after a determined angular travel the springs 51 and 81 act in series, which enables the relative angular travel between the disc 1 and the hub 11 to be increased. Of course, the stiffness of the springs 51 may differ slightly from that of spring 81. In general these springs have similar stiffnesses to work effectively in series.

Figure 5:
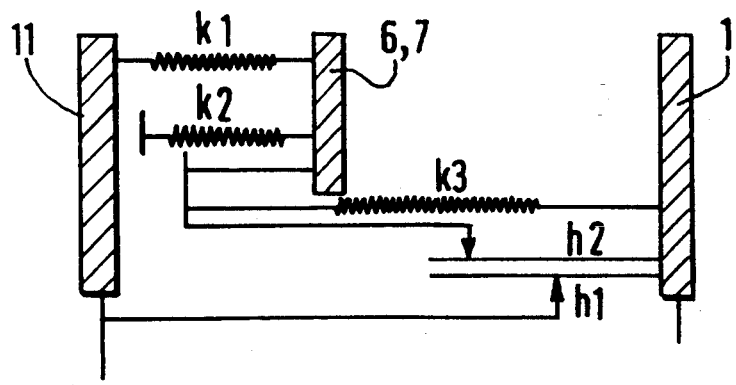
FIGS. 5 and 6 are schematic diagrams of the damper according to the invention, FIG. 6 showing graphically the torque transmitted by the torsion damper on axis C, and the relative angular travel between the input element and the output element of the damper at D.
Figure 15:
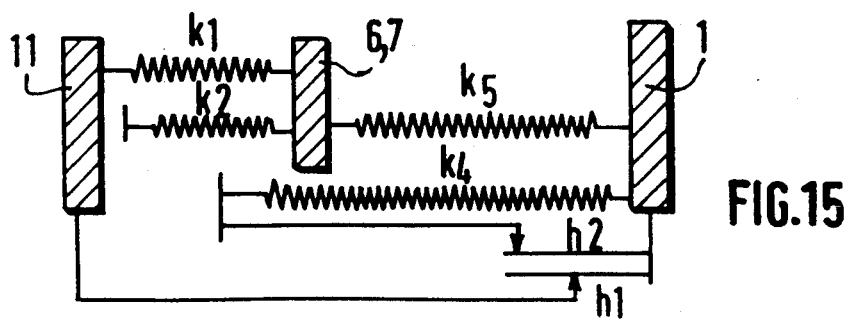
FIG. 15 is a diagram similar to that in FIG. 5 for this embodiment.

For more details reference should be made to FIG. 15, in which k1 represents, as in FIG. 5, the stiffness of the springs 8, k2 the stiffness of the springs 81, k5 the stiffness of the springs 51 and k4 the stiffness of the springs 50. This enables the angular travel between the disc 1 and the hub 11 to be increased.

In this case the friction means 10 urge the plates 6, 7 axially towards the wheel disc 4, to induce friction by means of plates 60, 70.

The disc 1 may be fixed directly onto the flywheel 12, as in this case no pressure plate is provided, and the hub 11 drives, for example, the primary shaft of a variable speed belt and pulley drive.

In certain cases the guide washer 2 may be radially extended and be fixed directly to the flywheel 12 in the manner described above.

This guide washer 2 then forms the input element of the damper.

The recesses made in the guide washers 2, 3 may be formed by press-formed parts, and the recesses for the springs 5 may be open at the outer periphery of the wheel disc, depending on the torque to be transmitted.

In this case, the spacer means attaching the washers 2, 3 to one another may consist of a ring, fixed by riveting on the washers 2, 3 and having radial lugs extending into the open recesses on the wheel disc, the said lugs being fitted radially beyond the springs 5 and being adapted to cooperate with the lateral edges of said recesses in order to limit the angular travel between the wheel disc 4 and the washers 2, 3.

The washer 30 may have (shown in FIG. 12 by a dotted line) at its outer periphery lugs 142 for meshing with clearance with the lower edge of the windows 25.

In this case the washer 30 is actuated with clearance by the wheel disc 4 without being mounted on the springs 5 and without interference therewith.

It will be appreciated that in FIGS. 8 and 11, the second elastic washer 133, 143 may be mounted between the second guide washer 2 and the second friction washer 131, 431. For this it is only necessary to offset axially, in the opposite direction to the wheel disc 4, the inner periphery of the guide washer 2 and the radial shoulder in the form of an elbow of bearing 131, or the hooked lugs 400 then coming into engagement with the guide washer 2 to axially lock the bearing 131, 431 in one direction.

It will be noted, considering the weight of the washers 133, 433, that the bearing 131, 431 will not move axially in the other axial direction.

In all cases the friction spacer therefore comprises the second elastic washer. As a refinement, the second friction washer may be connected directly to the guide washer, for example by crimping or riveting, this washer may locally have pins with shoulders, penetrating into an associated aperture provided in the guide washer, and fixed thereto by driving back material to the guide washer. Thus this second friction washer is directly connected to the guide washer both axially and in rotation. It is possible then to fit the second elastic washer between the second guide washer and the second friction washer, which will not move axially with respect to the second guide washer.

It will be appreciated that the second elastic washer may rest on the second friction washer to stress the third friction washer on contact with the second guide washer. A bearing washer, connected in rotation to the second friction washer, is advantageously inserted between said second friction washer and the third friction washer.

In all cases it is possible to form a unit with the second guide washer, a friction spacer then being interposed between the respective retention plate and the second guide washer.

The second friction washer is in all cases offset axially with respect to the second guide washer and with it defines a recess in which is mounted the third friction washer, which as a refinement may be divided into two washers, each then having a fork 38, 39. In all cases the friction system associated with the first springs 5 only extends on one side of the wheel disc, apart from the flanges 39. Of course, the thickness of the wheel disc 4 and of the reaction plates 6, 7 is such that the second elastic members 8, 81 do not interfere with the first and the second friction washer. Each reaction plate preferably forms a bearing mounted on the hub 11.

What is claimed is:

1. A torsion damper comprising a clutch friction disc for a motor vehicle, comprising an input element, two guide washers integral with the input element, an annular wheel disc disposed between the guide washers, first elastic members circumferentially interposed between the wheel disc and the guide washers and supported by the guide washers whilst being mounted with clearance in first recesses of the wheel disc, reaction plates disposed on both sides of the wheel disc between said guide washers, second elastic members, which are at least partly less stiff than said first elastic members interposed circumferentially between the reaction plates and the wheel disc, drive means acting between said reaction plates and at least one portion of the first elastic members, elastically gripping friction means interposed axially between the guide washers and the reaction plates, and an output element comprising a hub integral with the wheel disc and surrounded rotationally by the guide washers and the reaction plates; wherein second elastic members are fitted radially under said first elastic members and said elastically gripping friction means comprise at least one first axially-acting elastic washer, which axially urges the reaction plates towards the wheel disc to induce friction between said plates and the wheel disc, and wherein each reaction plate is in frictional contact with a friction washer locked in rotation with the respective guide washer; said first elastic washer is interposed axially between one of the guide washers, referred to as the first guide washer, and one of the friction washers, referred to as the first friction washer; an other friction washer, referred to as the second friction washer, is locked axially onto the other guide washer, referred to as the second guide washer, and belongs to a friction spacer comprising a stack of washers, one of which forms a third friction washer and is capable of coming into engagement with the wheel disc to induce friction on contact with either said second guide washer or said second friction washer; and said third friction washer is subject to the action of at least one second axially-acting elastic washer acting between said second friction washer and said second guide washer.

2. A torsion damper according to claim 1, wherein said reaction plates are made entirely from plastics material.

3. A torsion damper according to claim 1, wherein said third friction washer comprises, at its outer periphery, at least one fork having two radial lugs each with a flange perpendicular to the plane of said washer for engagement with the circumferential ends of a spring belonging to said first elastic members, said flanges being adapted for deferred actuation by the wheel disc.

4. A torsion damper according to claim 3, wherein said friction spacer forms part of a hysteresis cassette locked in rotation with said second guide washer and forming a sub-unit with said second guide washer by means of the second axially-acting elastic washer urging said third friction washer and said second friction washer towards said second guide washer.

5. A torsion damper according to claim 4, wherein said second elastic washer is mounted outside the volume delimited by the guide washers and is supported on said second guide washer and on a shoulder belonging to said second friction washer adapted for contact with the reaction plate.

6. A torsion damper according to claim 4, wherein said second elastic washer is mounted inside the volume delimited by the guide washers and consists of elastic lugs protruding from the inner periphery of a disc, forming the input element, for urging said second friction washer towards the second guide washer.

7. A torsion damper according to claim 4, wherein said second friction washer forms and annular bearing locked in rotation on the guide washer whilst being mounted on the outer periphery of the hub.

8. A torsion damper according to claim 7, wherein said second elastic washer is adapted to rest on said bearing.

* * * * *